United States Patent
Chen et al.

(10) Patent No.: US 8,695,351 B2
(45) Date of Patent: Apr. 15, 2014

(54) HULA SEAL WITH PREFERENTIAL COOLING HAVING SPRING FINGERS AND/OR ADJACENT SLOTS WITH DIFFERENT WIDTHS

(75) Inventors: Wei Chen, Greer, SC (US); Donald Timothy Lemon, Greenville, SC (US); Mert Enis Berkman, Greenville, SC (US); Richard Martin Dicintio, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 66 days.

(21) Appl. No.: 13/101,641

(22) Filed: May 5, 2011

(65) Prior Publication Data

US 2012/0279226 A1 Nov. 8, 2012

(51) Int. Cl.
*F02C 1/00* (2006.01)
*F02G 3/00* (2006.01)

(52) U.S. Cl.
USPC .......... 60/752; 60/753; 60/754; 60/755; 60/756; 60/759; 60/757; 60/758; 60/760; 60/800; 277/355; 277/500

(58) Field of Classification Search
USPC .......... 60/752–760, 800; 277/335, 500
See application file for complete search history.

(56) References Cited

U.S. PATENT DOCUMENTS

| | | | | |
|---|---|---|---|---|
| 6,644,667 | B2 * | 11/2003 | Grondahl | 277/355 |
| 6,869,082 | B2 * | 3/2005 | Parker | 277/630 |
| 7,007,482 | B2 * | 3/2006 | Green et al. | 60/752 |
| 7,269,957 | B2 * | 9/2007 | Martling et al. | 60/800 |
| 7,578,509 | B2 * | 8/2009 | Grondahl | 277/355 |
| 7,594,401 | B1 | 9/2009 | Chen et al. | |
| 7,926,283 | B2 * | 4/2011 | Byrne et al. | 60/752 |
| 8,079,219 | B2 * | 12/2011 | Johnson et al. | 60/752 |
| 2009/0115141 | A1 | 5/2009 | Simmons | |

OTHER PUBLICATIONS

EP Search Report and Written Opinion from Application No. 12166662.2 dated Sep. 17, 2012.

* cited by examiner

*Primary Examiner* — Gerald L Sung
*Assistant Examiner* — Craig Kim
(74) *Attorney, Agent, or Firm* — Nixon & Vanderhye P.C.

(57) ABSTRACT

An annular seal for use between coupled combustor components includes a segmented annular solid edge portion and a plurality of alternating spring fingers and slots extending from the solid edge portion and arranged about a circumference of the solid edge portion, wherein one or more of the plurality of spring fingers or one or more of the plurality of straight and angled slots have non-uniform width dimensions.

10 Claims, 5 Drawing Sheets

HULA SEAL WITH PREFERENTIAL COOLING HAVING SPRING FINGERS AND/OR ADJACENT SLOTS WITH DIFFERENT WIDTHS

BACKGROUND

The present invention relates to internal cooling within a gas turbine engine, and more particularly, to seals used between combustor components that also enhance cooling within the region of the seal.

Air management is an important consideration in combustor design. Air streams provide an oxidizer for the combustion process and also provide cooling to hot gas path components of the combustor. Seals are typically provided between various components of the combustor to prevent hot combustion gas from leaking from the combustor. Seal configurations and functions of those seals are unique in the combustor. For example, a seal providing complete sealing of flow from one area to another may not be desired but rather, a seal resulting in a small amount of cooling air "leak" may be preferred. Within combustion zones, cooling must be properly designed to provide adequate cooling for hot gas path components while only minimally disturbing combustion ignition and stability.

Seals are typically used between, for example, gas turbine combustor liners and transition pieces or ducts that carry hot combustion gases to the first stage of the gas turbine. They typically include C-rings, spring-finger or "hula" rings, cloth seals and the like, all of which are subjected to high temperature and pressure as well as high gradients of pressure and temperature across the seals.

There remains need for enhanced levels of active cooling with minimal pressure losses at high-firing temperatures by, for example, targeting hot streaks along the hot side of the combustor liner and transition piece or duct for preferential cooling.

BRIEF SUMMARY OF THE INVENTION

Accordingly, in one exemplary but nonlimiting embodiment, the invention provides an annular seal for use between coupled combustor components, the annular seal comprising a segmented annular solid edge portion and a plurality of alternating spring fingers and slots extending from said solid edge portion and arranged about a circumference of said solid edge portion, wherein one or more of said plurality of spring fingers, or one or more of said plurality of slots, have non-uniform width dimensions.

In another exemplary but nonlimiting embodiment, the invention provides gas turbine combustor assembly comprising a substantially cylindrical combustor liner secured at a forward end to an end cap supporting one or more nozzles; a transition piece having a forward end telescopically received over an aft end of said combustor liner, an aft end of said transition piece adapted for attachment to a turbine first stage; and an annular seal disposed radially between said aft end of said combustor liner and said forward end of said transition piece, said annular seal comprising a segmented annular solid edge portion and a plurality of spring fingers extending from said solid edge portion and arranged about a circumference of said solid edge portion, said spring fingers separated by adjacent slots, and wherein at least some of said plurality of spring fingers are arranged angularly relative to a centerline axis through the annular seal.

In still another exemplary but nonlimiting embodiment, the invention provides method of preferentially cooling a region in a turbine combustor where a combustor liner is joined to a transition piece, and an annular spring finger seal is located radially between an aft end of said combustor liner and a forward end of said transition piece, and wherein said annular spring finger seal comprises a plurality of spring fingers extending from a segmented annular solid edge, the method comprising diverting a portion of air flowing in one direction to the combustor to flow in an opposite direction through said annular seal; and arranging said plurality of spring fingers by width or angular orientation to direct air flowing through said annular seal one or more targeted regions of the combustor liner or the transition piece where differentially higher temperatures have been identified as compared to other regions of the combustor liner or transition piece.

The invention will now be described in detail in connection with the drawings identified below.

DETAILED DESCRIPTION OF THE INVENTION

Figure 1:
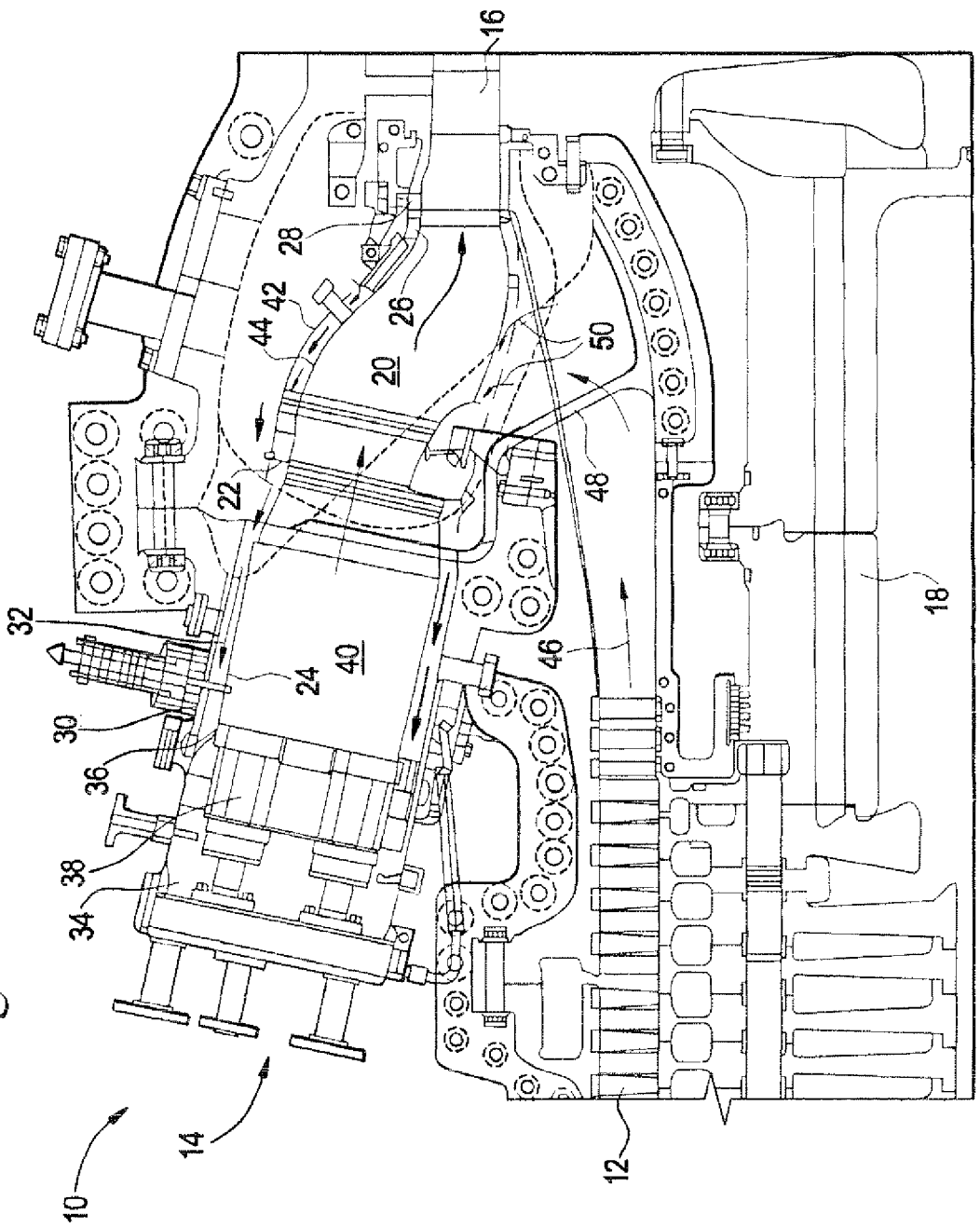
FIG. 1 is a simplified schematic cross-sectional view of a gas turbine combustor.

Shown in FIG. 1 is a gas turbine 10. The gas turbine 10 includes a compressor 12 which provides compressed fluid to a combustor 14. Fuel is injected into the combustor 14, mixes with the compressed air and is ignited. The hot gas products of the combustion flow to a turbine 16 which extracts work from the hot gas to drive a rotor shaft 18 which in turn drives the compressor 12. A transition piece 20 is coupled at an upstream end 22 to the combustor 14 at a combustor liner 24 and at a downstream end 26 to an aft frame 28 of the turbine 16. The transition piece 20 carries hot gas flow from the combustor liner 24 to the turbine 16. The combustor 14 includes a combustor sleeve 30 spaced radially outward from the combustor liner 24 defining a combustor flow channel 32 therebetween. A combustor cap 34 is coupled to an upstream end 36 of the combustor liner 24 and includes at least one nozzle 38 disposed therein an extending into a combustion chamber 40 defined by the combustor cap 34 and the combustor liner 24. An impingement sleeve 42 is coupled to the combustor sleeve 30 and is radially spaced from the transition piece 20 defining a transition flow channel 44 therebetween.

During operation, discharge flow 46 flows from the compressor 12 through a diffuser 48 to the impingement sleeve 42. The discharge flow 46 proceeds through a plurality of impingement holes 50 in the impingement sleeve 42 and toward the combustor 14 in the transition flow channel 44. The discharge flow 46 proceeds from the transition flow channel 44 and through the combustor flow channel 32 until it is finally introduced to the combustor liner 24 through the at least one nozzle 38. In addition to providing air to the combustor 14 for the combustion process, the relatively cool discharge flow 46 further provides much needed cooling to the components exposed to hot combustion gas, for example, the combustor liner 24 and the transition piece 20.

Figure 2:
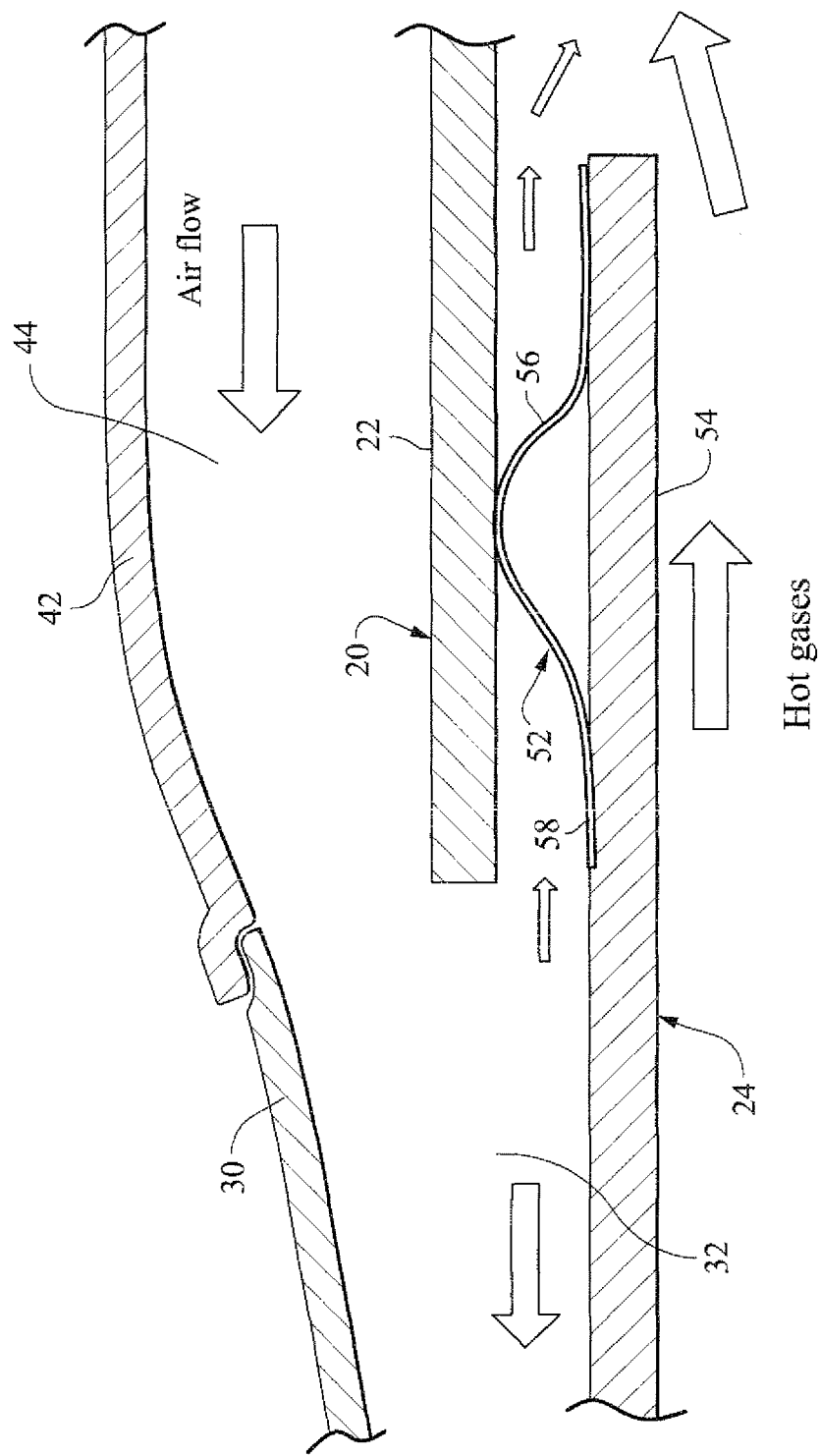
FIG. 2 is an enlarged partial cross-sectional view of the interface between the combustor liner and transition piece components removed from FIG. 1.
Figure 3:
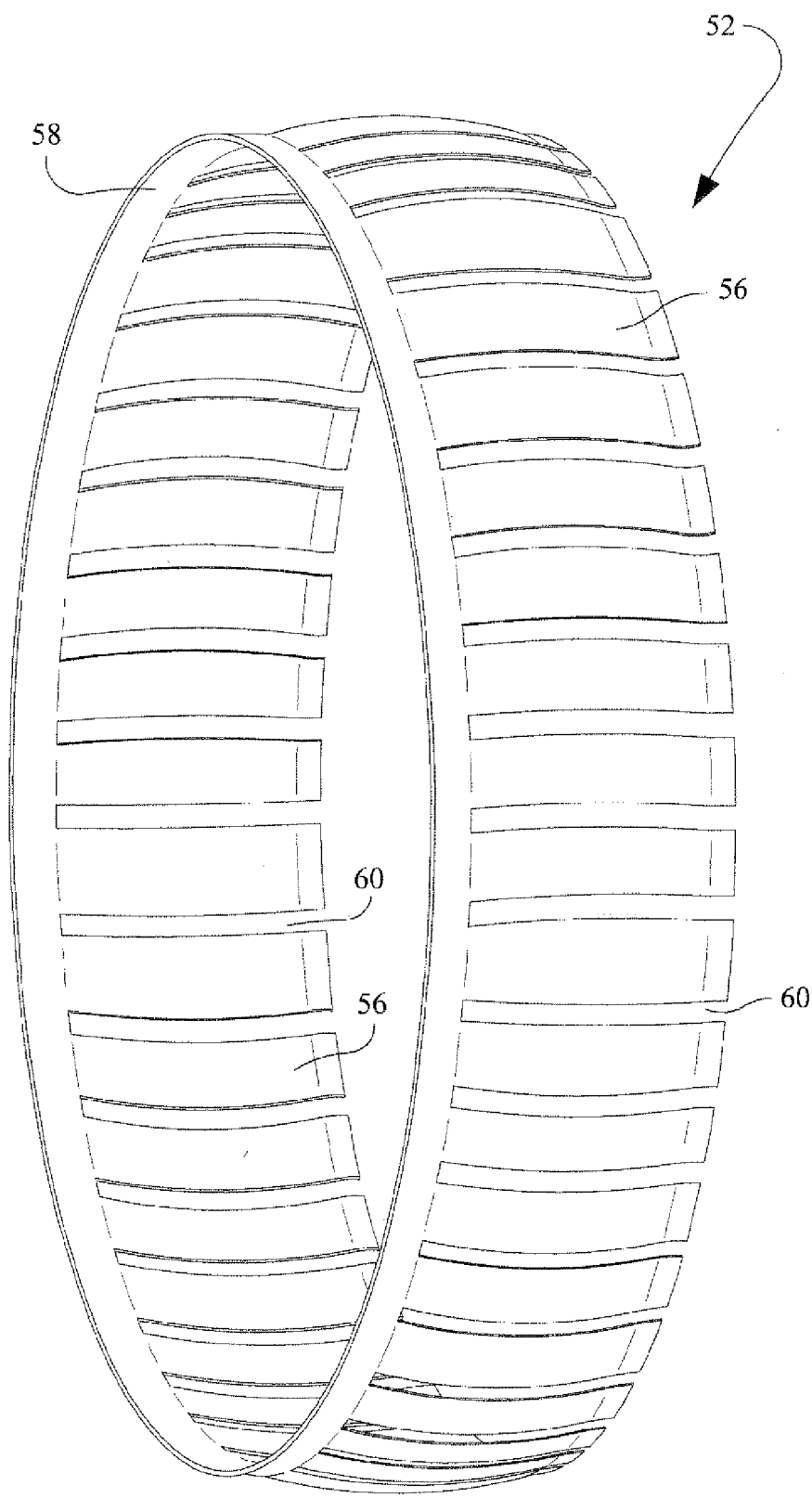
FIG. 3 is a perspective view of a conventional spring-finger or hula seal used at the interface between the combustor liner and the transition piece.

At the interface between the transition piece and the combustor liner, there is a telescoping fit, where the aft end of the combustor liner is received within the forward end of the transition piece. With reference to FIG. 2, an annular spring-finger seal 52, also known as a hula seal, is located radially between the aft end 54 of the liner 24 and the forward end 22 of the transition piece 20. Typically, the spring fingers 56 have uniform widths and extend from a solid end or edge 58 of the seal in an axial direction, uniformly spaced about the circumference of the seal edge, separated by slots 60 as best seen in FIG. 3. It will be appreciated that the solid edge 58 may be on the upstream or downstream ends of the spring fingers. As in well understood in the art, the seal comprises two or more arcuate segments which, when assembled, form a complete 360° annular seal.

Figure 4:
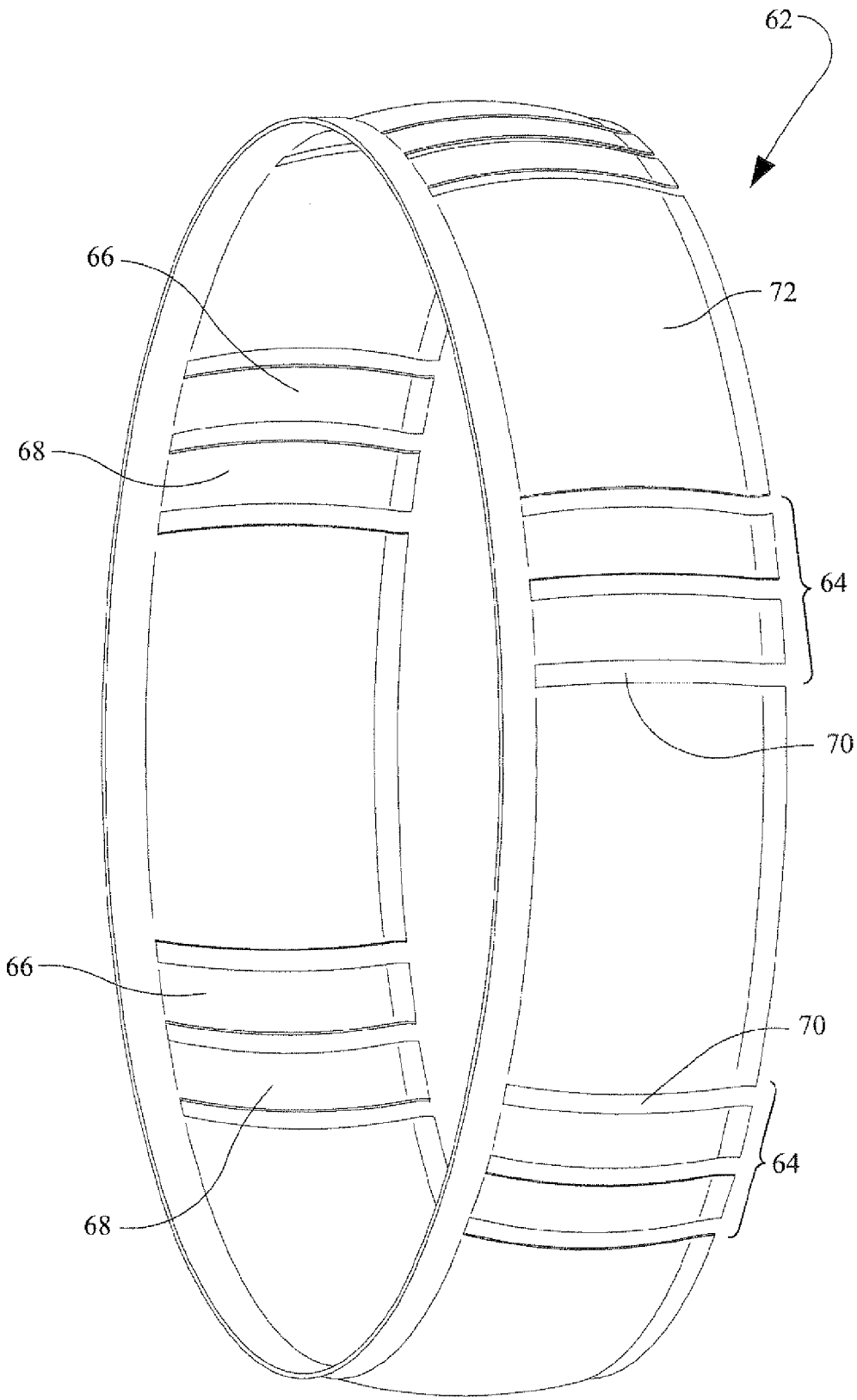
FIG. 4 is a perspective view of a spring-finger or hula seal used at the interface between the combustor liner and the transition piece in accordance with an exemplary but nonlimiting embodiment.

In exemplary but nonlimiting embodiments of the invention, the hula seal is reconfigured to direct cooling air to specific high-temperature regions of the liner and/or transition piece identified as having "hot streaks" related to fuel/air ratio (FAR) and combustion swirling angles. In FIG. 4, for example, an annular hula seal 62 is formed with discrete groups 64 of two axially-oriented spring fingers 66, 68 each, at spaced locations about the circumference of the seal. While the spacing between the groups is shown to be substantially uniform, it will be appreciated that the spacing may vary in asymmetric fashion, based on the location of identified hot streaks. In other words, the groups 64 of spring fingers, and just as importantly, the groups of slots 70 between the spring fingers, may be located and arranged so as to preferentially cool any desired region of the aft end of the liner and/or the forward end of the transition piece. Seal portions 72 between the groups 64 in fact comprise spring fingers of substantially greater width than fingers 66, 68. As such, the larger-width spring fingers may also be used/arranged to divert cooling air away from identified cooler regions of the liner or transition piece toward the hot regions so as to promote cooling uniformity without the need for additional cooling air.

Figure 5:
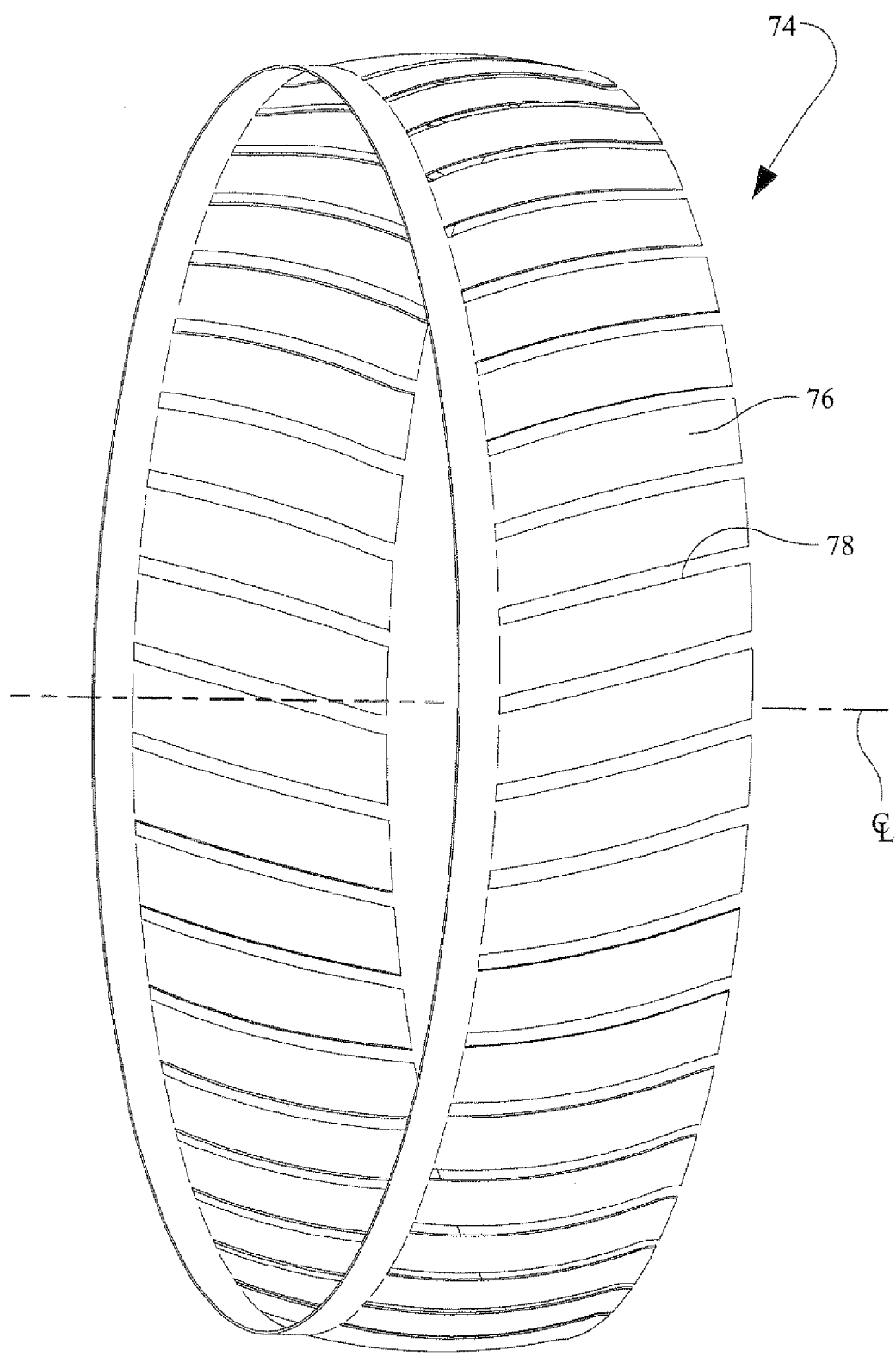
FIG. 5 is a perspective view of a spring-finger or hula seal used at the interface between the combustor liner and the transition piece in accordance with another exemplary but nonlimiting embodiment.

FIG. 5 illustrates a further example embodiment of an annular hula seal 74 where the spring fingers 76 and slots 78 are uniformly spaced about the circumference of the seal, but angled relative to a centerline axis CL through the seal to swirl the cooling air passing through the seal. It will be appreciated that the embodiments shown in FIGS. 4 and 5 can be combined so that discrete groups of spring fingers and associated slots are angled in the same or different directions to not only swirl the cooling air but to also preferentially cool certain liner and or transition piece regions. Here again, spring fingers and slots between the spring fingers can have the same or differential width dimensions.

By preferentially targeting specific regions of the adjacent components, (whether hot or cold) through unique seal design, more efficient cooling is provided with minimum air flow. Minimizing cooling flow, in turn, reduces emissions and increases the service life of the components.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An annular seal for use between coupled combustor components, the annular seal comprising a segmented annular solid edge portion and a plurality of alternating spring fingers and slots extending from said solid edge portion and arranged about a circumference of said solid edge portion, wherein adjacent fingers are separated by slots defined by substantially parallel sides of said adjacent fingers, and wherein at least some of said plurality of spring fingers have different width dimensions and at least some of said plurality of slots have different width dimensions chosen such that cooling medium flowing across said annular seal can be directed preferentially to targeted areas of said combustor components.

2. The annular seal of claim 1 wherein said plurality of spring fingers are substantially uniformly angled relative to a centerline axis through the seal.

3. An annular seal for use between coupled combustor components, the annular seal comprising a segmented annular solid edge portion and a plurality of alternating spring fingers and slots extending from said solid edge portion and arranged about a circumference of said solid edge portion, wherein one or more of said plurality of spring fingers have different width dimensions than other of said spring fingers and, some of said plurality of slots, have different width dimensions than other said slots; and
    wherein said plurality of spring fingers are arranged in plural discrete groups of spring fingers having substantially identical width dimensions that are smaller than width dimensions of spring fingers in other discrete groups of said plurality of spring fingers, said width dimensions of said spring fingers and said slots chosen such that cooling medium flowing across said annular seal can be directed preferentially to targeted areas of said combustor components.

4. The annular seal of claim 3 wherein each of said plural discrete groups has an identical number of spring fingers.

5. The annular seal of claim 3 wherein at least some of said discrete plural groups have different numbers of spring fingers than other of said discrete groups.

6. The annular seal of claim 3 wherein said plurality of spring fingers are substantially uniformly angled relative to a centerline axis through the seal.

7. A gas turbine combustor assembly comprising:
    a substantially cylindrical combustor liner secured at a forward end to an end cap supporting one or more nozzles;
    a transition piece having a forward end telescopically received over an aft end of said combustor liner, an aft end of said transition piece adapted for attachment to a turbine first stage; and
    an annular seal disposed radially between said aft end of said combustor liner and said forward end of said transition piece, said annular seal comprising a segmented annular solid edge portion and a plurality of spring fingers extending from said solid edge portion and arranged about a circumference of said solid edge portion, said spring fingers separated by adjacent slots defined by substantially parallel sides of adjacent spring fingers, and wherein at least some of said slots have different width dimensions than other of said slots, said width dimensions chosen such that cooling medium flowing across said annular seal can be directed preferentially to targeted areas of said combustor components.

8. The annular seal of claim 7 wherein all of said plurality of spring fingers are substantially uniformly angled relative to said centerline axis through the seal.

9. The annular seal of claim 8 wherein said plurality of spring fingers have substantially uniform widths.

10. The annular seal of claim 8 wherein at least some of said plurality of spring fingers have non-uniform widths.

\* \* \* \* \*